(12) United States Patent
Chen

(10) Patent No.: US 11,532,095 B2
(45) Date of Patent: Dec. 20, 2022

(54) APPARATUS, METHOD, AND MEDIUM FOR MERGING PATTERN DETECTION RESULTS

(71) Applicant: CANON KABUSHIKI KAISHA, Tokyo (JP)

(72) Inventor: Tsewei Chen, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/882,934

(22) Filed: May 26, 2020

(65) Prior Publication Data

US 2020/0286252 A1    Sep. 10, 2020

Related U.S. Application Data

(63) Continuation of application No. PCT/JP2018/043898, filed on Nov. 29, 2018.

(30) Foreign Application Priority Data

Dec. 1, 2017    (JP) .............................. JP2017-231927

(51) Int. Cl.
*G06K 9/36*    (2006.01)
*G06T 7/70*    (2017.01)
(Continued)

(52) U.S. Cl.
CPC .............. *G06T 7/70* (2017.01); *G06K 9/6215* (2013.01); *G06K 9/6292* (2013.01); *G06V 10/25* (2022.01); *G06V 10/26* (2022.01); *G06V 10/809* (2022.01)

(58) Field of Classification Search
CPC ........... G06K 9/00201; G06K 9/00221; G06K 9/00228; G06K 9/00362; G06K 9/00369;
(Continued)

(56) References Cited

U.S. PATENT DOCUMENTS 8,428,361 B2    4/2013    Uno
9,275,308 B2 *  3/2016    Szegedy ............. G06V 10/454
(Continued)

FOREIGN PATENT DOCUMENTS

| JP | 2011-134045 A | 7/2011 |
| JP | 2011-209951 A | 10/2011 |
| JP | 2011209951 A * | 10/2011 |

OTHER PUBLICATIONS

Paul Viola, et al., "Rapid Object Detection using a Boosted Cascade of Simple Features," Proceedings of IEEE Conference on Computer Vision and Pattern Recognition, vol. 1, Dec. 2001, pp. 511-518.
(Continued)

*Primary Examiner* — Eric Rush
(74) *Attorney, Agent, or Firm* — Venable LLP

(57) ABSTRACT

There is provided with an information processing apparatus. An acquisition unit acquires a plurality of pattern discrimination results each indicating a location of a pattern that is present in an image. A selection unit selects a predetermined number of pattern discrimination results from the plurality of pattern discrimination results. A determination unit determines whether or not the selected predetermined number of pattern discrimination results are to be merged, based on a similarity of the locations indicated by the predetermined number of pattern discrimination results. A merging unit merges the predetermined number of pattern discrimination results for which it was determined by the determination unit that merging is to be performed. A control unit controls the selection unit, the determination unit, and the merging unit to repeatedly perform respective processes.

17 Claims, 7 Drawing Sheets

(51) Int. Cl.
*G06K 9/62* (2022.01)
*G06V 10/25* (2022.01)
*G06V 10/26* (2022.01)
*G06V 10/80* (2022.01)

(58) Field of Classification Search
CPC ........... G06K 9/00624; G06K 9/00664; G06K 9/00771; G06K 9/00778; G06K 9/2054; G06K 9/3216; G06K 9/3233; G06K 9/3241; G06K 9/34; G06K 9/342; G06K 9/4628; G06K 9/4642; G06K 9/6201; G06K 9/6202; G06K 9/6215; G06K 9/6218; G06K 9/6219; G06K 9/629; G06K 9/6292; G06K 9/6293; G06K 2009/3291; G06T 7/10; G06T 7/11; G06T 7/70; G06T 2207/20016; G06T 2207/20021; G06T 2207/30196; G06V 10/22; G06V 10/25; G06V 10/26; G06V 10/42; G06V 10/44; G06V 10/759; G06V 10/761; G06V 10/762; G06V 10/80; G06V 10/803; G06V 10/806; G06V 10/809; G06V 40/10; G06V 40/16; G06V 40/161; G06V 2201/07
USPC ........ 382/100, 103–105, 115, 117, 118, 155, 382/159, 165, 173, 181, 199, 209, 382/215–219, 224, 225, 282, 283, 291
See application file for complete search history.

(56) References Cited

U.S. PATENT DOCUMENTS

| | | | |
|---|---|---|---|
| 9,292,745 B2* | 3/2016 | Torii | G06V 40/103 |
| 2011/0158537 A1* | 6/2011 | Uno | G06K 9/00228 382/190 |
| 2016/0140399 A1* | 5/2016 | Yano | G06V 20/695 382/103 |
| 2016/0148079 A1* | 5/2016 | Shen | G06K 9/6257 382/157 |
| 2018/0075290 A1* | 3/2018 | Chen | G06K 9/6271 |
| 2018/0253848 A1* | 9/2018 | Chen | G06T 7/70 |
| 2018/0300880 A1* | 10/2018 | Fan | G06T 7/73 |
| 2019/0130583 A1* | 5/2019 | Chen | G06V 20/40 |
| 2020/0193225 A1* | 6/2020 | Olmeda Reino | G06V 10/25 |

OTHER PUBLICATIONS

Mar. 5, 2019 International Search Report in International Patent Appln. No. PCT/JP2018/043898.

* cited by examiner

FIRST PATTERN DISCRIMINATION RESULT INFORMATION

| POSITION:$(X_1, Y_1)$ |
|---|
| SIZE:$(W_1, H_1)$ |
| PATTERN-LIKENESS:$S_1$ |
| MERGE COUNT:$N_1$ |

SECOND PATTERN DISCRIMINATION RESULT INFORMATION

| POSITION:$(X_2, Y_2)$ |
|---|
| SIZE:$(W_2, H_2)$ |
| PATTERN-LIKENESS:$S_2$ |
| MERGE COUNT:$N_2$ |

APPARATUS, METHOD, AND MEDIUM FOR MERGING PATTERN DETECTION RESULTS

CROSS-REFERENCE TO RELATED APPLICATIONS

This application is a Continuation of International Patent Application No. PCT/JP2018/043898, filed Nov. 29, 2018, which claims the benefit of Japanese Patent Application No. 2017-231927, filed Dec. 1, 2017, both of which are hereby incorporated by reference herein in their entirety.

BACKGROUND OF THE INVENTION

Field of the Invention

The present invention relates to an information processing apparatus, an information processing method, and a medium, and in particular relates to processing for merging pattern discrimination results obtained through pattern discrimination processing performed on an image.

Description of the Related Art

A technique for discriminating a specific pattern such as a body or face of a person in an image has been proposed. In particular, in recent years, pattern discrimination methods for incorporated systems such as mobile terminals or vehicle-mounted devices have been attracting attention.

In Viola (P. Viola, M. Jones, "Rapid Object Detection using a Boosted Cascade of Simple Features", Proceedings of IEEE Conference on Computer Vision and Pattern Recognition, Vol. 1, pp. 511-518, December 2001), an algorithm for increasing the speed of pattern discrimination processing is proposed. In Viola, a parameter for pattern discrimination processing is generated through boosting learning. Then, weak discriminators connected in a cascade are used to discriminate whether or not each sub-window extracted from the image includes a pattern. In this manner, information on a region including a predetermined pattern is generated as a pattern discrimination result. With this method, there is a possibility that multiple different pattern discrimination results indicating a pattern at the same position will be obtained. In view of this, in Viola, the pattern discrimination results are classified such that pattern discrimination results whose regions overlap fall within the same subset. Then, the pattern discrimination results are merged for each subset, and one pattern discrimination result is generated. Specifically, the average coordinate values of the four corners of the regions are calculated for each subset and are used as the coordinate values of the four corners of the merged pattern discrimination result.

SUMMARY OF THE INVENTION

According to an embodiment of the present invention, an information processing apparatus comprises: an acquisition unit configured to acquire a plurality of pattern discrimination results each indicating a location of a pattern that is present in an image; a selection unit configured to select a predetermined number of pattern discrimination results from the plurality of pattern discrimination results; a determination unit configured to determine whether or not the selected predetermined number of pattern discrimination results are to be merged, based on a similarity of the locations indicated by the predetermined number of pattern discrimination results; and a merging unit configured to merge the predetermined number of pattern discrimination results for which it was determined by the determination unit that merging is to be performed; and a control unit configured to control the selection unit, the determination unit, and the merging unit to repeatedly perform respective processes.

According to another embodiment of the present invention, an information processing method comprises: acquiring a plurality of pattern discrimination results each indicating a location of a pattern that is present in an image; selecting a predetermined number of pattern discrimination results from the plurality of pattern discrimination results; determining whether or not the selected predetermined number of pattern discrimination results are to be merged, based on a similarity of the locations indicated by the predetermined number of pattern discrimination results; and merging the predetermined number of pattern discrimination results for which it has been determined that merging is to be performed, wherein the selecting, the determining, and the merging are repeatedly performed.

According to still another embodiment of the present invention, a non-transitory computer-readable medium stores a program which, when executed by a computer comprising a processor and a memory, causes the computer to perform: acquiring a plurality of pattern discrimination results each indicating a location of a pattern that is present in an image; selecting a predetermined number of pattern discrimination results from the plurality of pattern discrimination results; determining whether or not the selected predetermined number of pattern discrimination results are to be merged, based on a similarity of the locations indicated by the predetermined number of pattern discrimination results; and merging the predetermined number of pattern discrimination results for which it has been determined that merging is to be performed, wherein the selecting, the determining, and the merging are repeatedly performed.

Further features of the present invention will become apparent from the following description of exemplary embodiments with reference to the attached drawings.

DESCRIPTION OF THE EMBODIMENTS

In the case of an application for an incorporated system or the like, in pattern discrimination, it is required that results are output in real time in some cases. Due to multiple pattern discrimination results being merged, erroneous detection can be suppressed and the accuracy of the pattern discrimination results can be improved, but in this kind of situation, there is a possibility that merge processing will need to be stopped partway through.

With the method disclosed in Viola, pattern discrimination results whose regions overlap are merged after all of the pattern discrimination results whose regions overlap have been discovered. With this kind of method, there has been a problem in that if the merge processing is stopped partway through the processing for discovering all of the pattern discrimination results whose regions overlap, which is time-consuming, merging of the pattern discrimination results is not performed.

The present invention provides a technique for obtaining output obtained by merging some pattern discrimination results even if processing for merging pattern discrimination results is stopped partway through.

Hereinafter, embodiments of the present invention will be described with reference to the drawings. However, the scope of the present invention is not limited to the following embodiments.

Example of Configuration of Pattern Discrimination Apparatus

Figure 9:
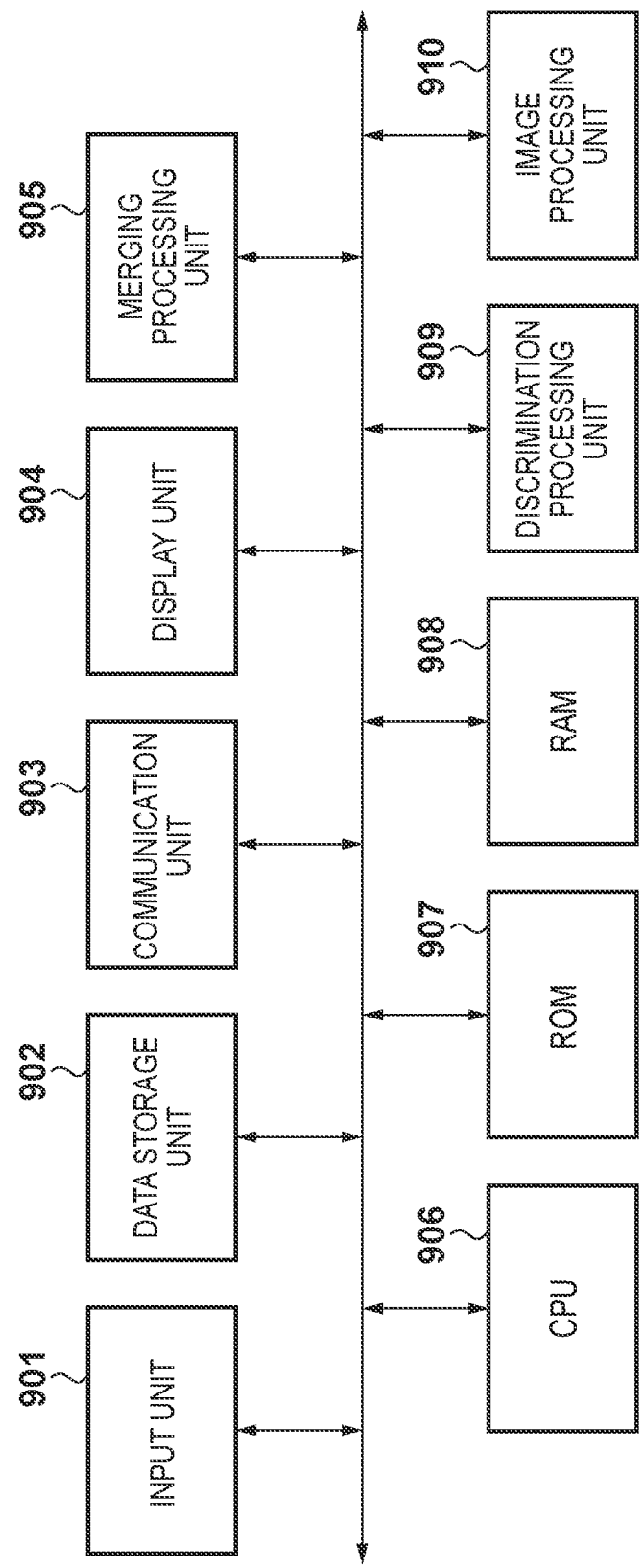
FIG. 9 is a block diagram showing an example of an information processing apparatus that functions as a pattern discrimination apparatus.

FIG. 9 is a block diagram showing an example of a configuration of an information processing apparatus 900 according to an embodiment of the present invention. The information processing apparatus shown in FIG. 9 is a pattern discrimination apparatus for detecting a region having a specific pattern such as a face or a human body by performing pattern discrimination processing on an image. Hereinafter, information indicating a region detected in this manner will be called a "pattern discrimination result". Also, the information processing apparatus 900 shown in FIG. 9 can operate as a pattern discrimination result merging apparatus or a region merging apparatus that performs merging processing for merging pattern discrimination results detected in this manner. As described before, in pattern discrimination processing, in some cases, multiple pattern discrimination results that include the same pattern but indicate mutually different regions are obtained for the same pattern in an image. In merging processing, processing is performed for the purpose of compiling pattern discrimination results indicating the same pattern into one pattern discrimination result. The details of merging processing will be described in detail later.

A data storage unit 902 is a unit that stores image data, and can be a memory. In an embodiment, the data storage unit 902 stores a moving image constituted by multiple frame images. The data storage unit 902 can be, for example, a hard disk, a flexible disk, a CD-ROM, a CD-R, a DVD, a memory card, a CF card, a SmartMedia, an SD card, a memory stick, an xD picture card, a USB memory, or the like. The information processing apparatus 900 may also use a portion of a later-described RAM 908 as the data storage unit 902.

The display unit 904 is an apparatus that displays an image, and can display an image that has not yet been subjected to image processing, an image that has been subjected to image processing, a GUI, or the like. The display unit 904 can be, for example, a CRT, a liquid crystal display, or the like.

An input unit 901 is an apparatus that acquires instructions from a user or data. The input unit 901 can be, for example, a keyboard, a pointing apparatus, or a button. The display unit 904 and the input unit 901 may also be the same apparatus, such as a touch screen apparatus. In this case, input from the touch screen can be treated as input to the input unit 901.

A CPU 906 is a processor that performs overall control of operations of the information processing apparatus 900. A ROM 907 and a RAM 908 are memories that provide the CPU 906 with programs, data, work regions, and the like needed for processing. If programs needed for later-described merging processing are stored in the data storage unit 902 or the ROM 907, these programs are read out to the RAM 908. Also, if the information processing apparatus 900 receives a program via a communication unit 903, the program is stored in the data storage unit 902 and is thereafter read out to the RAM 908, or is read out directly from the communication unit 903 to the RAM 908. Then, the CPU 906 operates in accordance with these programs in the RAM 908, whereby operation control is performed.

A discrimination processing unit 909 receives a command from the CPU 906, reads out the image data written in the data storage unit 902, and executes pattern discrimination processing on the image data. Although processing for detecting a specific type of object having a predetermined pattern, such as facial discrimination processing or human body discrimination processing, is given as an example of pattern discrimination processing, there is no particular limitation thereto. Also, the discrimination processing unit 909 writes the obtained discrimination result in the RAM 908. However, it is not essential that the information processing apparatus 900 includes the discrimination processing unit 909, and the information processing apparatus 900 may also acquire the discrimination result from an external discrimination processing unit.

A merging processing unit 905 performs merging processing on the discrimination results written in the RAM 908. The merging processing will be described in detail later. Also, the merging processing unit 905 writes the merged discrimination result in the data storage unit 902 or the RAM 908.

An image processing unit 910 can perform image processing on an image in accordance with the merged discrimination result. The image processing can be, for example, image correction processing performed on a predetermined region in accordance with the discrimination result, image extraction processing for extracting a predetermined region in accordance with the discrimination result, image analysis processing for analyzing a predetermined region in accordance with the discrimination result, image recognition processing for specifying an object that appears in a predetermined region in accordance with the discrimination result, or the like. Also, specific examples of the image processing include processing for specifying a human body and processing for correcting complexion. However, the type of image processing that is performed is not particularly limited. The processing result obtained by the image processing unit 910 is written in the data storage unit 902 or the RAM 908. However, it is not essential that the information processing apparatus 900 includes the image processing unit 910, and an external processing apparatus that acquires the merged discrimination result can also perform this kind of image processing.

The discrimination processing unit 909, the merging processing unit 905, and the image processing unit 910 can process multiple images one by one. For example, the discrimination processing unit 909, the merging processing unit 905, and the image processing unit 910 can sequentially process multiple frame images constituting a moving image. Note that the information processing apparatus 900 shown in FIG. 9 has one CPU 906, but may also have multiple CPUs. Also, one or more of the discrimination processing unit 909, the merging processing unit 905, and the image processing unit 910 may also be realized by the CPU 906. That is, the functions of these units can be realized due to the CPU 906 operating in accordance with programs in the RAM 908.

The communication unit 903 is an interface for performing communication between devices. The information processing apparatus 900 can acquire data from an external apparatus via the communication unit 903. The information processing apparatus 900 shown in FIG. 9 includes the input unit 901, the data storage unit 902, and the display unit 904, but it is not essential to include these units. For example, the information processing apparatus may also be connected to these apparatuses via the communication unit 903 or via a cable. For example, the information processing apparatus 900 may also use a storage apparatus (not shown) that is connected via the communication unit 903 as a virtual data storage unit.

The information processing apparatus 900 can have various elements other than those described above, but description thereof is omitted.

Processing for Merging Pattern Discrimination Results

First, the pattern discrimination results generated by the discrimination processing unit 909 will be described. In the present embodiment, the discrimination processing unit 909 detects a predetermined pattern from an image and generates information indicating regions in which the pattern was detected, as pattern discrimination results. The discrimination processing unit 909 can detect a predetermined pattern from multiple regions of one image (e.g., one frame image included in a moving image). In one example, the discrimination processing unit 909 can determine whether or not a predetermined pattern is included in each sub-window extracted from various positions and regions of various sizes in an image. The discrimination processing unit can also perform pattern discrimination processing using multiple different methods. In such a case, the discrimination processing unit 909 can obtain multiple pattern discrimination results for one image, but the pattern discrimination results may indicate the same object or different objects. In the present embodiment, the merging processing unit 905 merges pattern discrimination results that indicate the same object.

Figure 2:
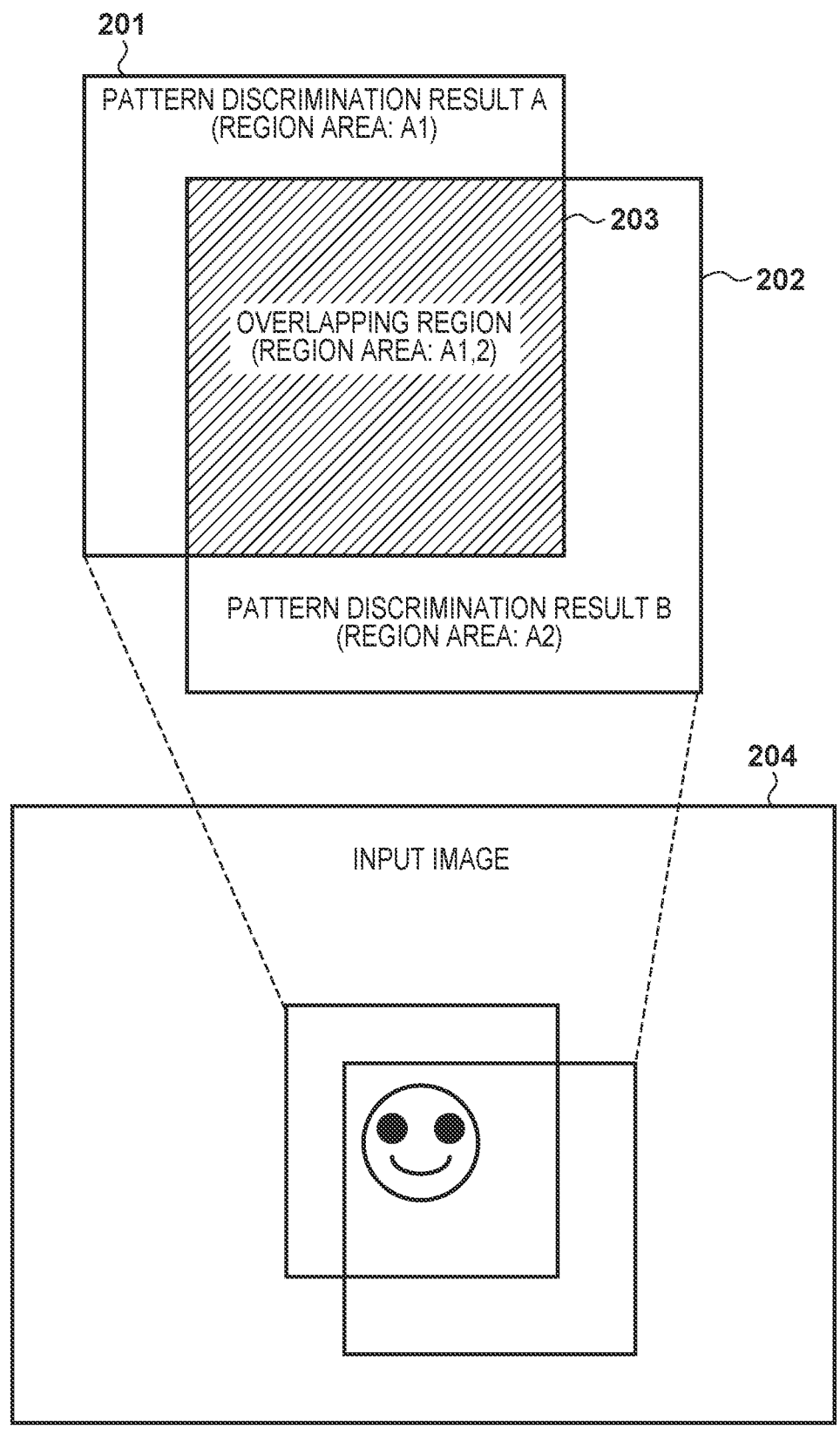
FIG. 2 is a diagram showing an example of overlapping pattern discrimination results.

For example, in the example shown in FIG. 2, there are two pattern discrimination results, and each pattern discrimination result includes a smile pattern in an input image 204. A rectangle 201 is a region indicated by a discrimination result A and has a smile pattern in its central region. A rectangle 202 is a region indicated by a discrimination result B and has a smile pattern in its upper-left portion. The discrimination result A and the discrimination result B include the same smile pattern in the input image 204, and therefore are merged by the merging processing unit 905.

In the following description, one pattern discrimination result indicates a location at which a pattern was detected. The pattern discrimination result can be represented using a data set indicating the location of the pattern that is present in the image. The data set representing the pattern discrimination result can include region information indicating the location of the pattern. For example, a data set indicating one discrimination result can include information on the region in which the pattern was detected. In a specific example, a data set indicating one discrimination result can include position information (e.g., coordinate values) of the region in which the pattern was detected, and size information of the region in which the pattern was detected (e.g., the width and height of the region). Hereinafter, this kind of data set will simply be called a "pattern discrimination result" in some cases.

Also, a data set representing a pattern discrimination result can include information that is unrelated to the location of the pattern (second information), in addition to information indicating the location of the pattern (first information). Information that is unrelated to the location of the pattern can be, for example, at least one of information indicating the likelihood that a specific pattern is present at the location indicated by the information indicating the location of the pattern, and information indicating a characteristic of the pattern that is present at the location indicated by the information indicating the location of the pattern. The information indicating the likelihood that the specific pattern is present can be, for example, the degree of reliability of the pattern discrimination result (pattern-likeness). This kind of pattern-likeness can be acquired when pattern discrimination is performed using a known machine learning technique. Also, information indicating a characteristic of the pattern can be, for example, information such as the orientation or angle of the pattern, or the size of the pattern.

Figures 7, 8A, 8B:
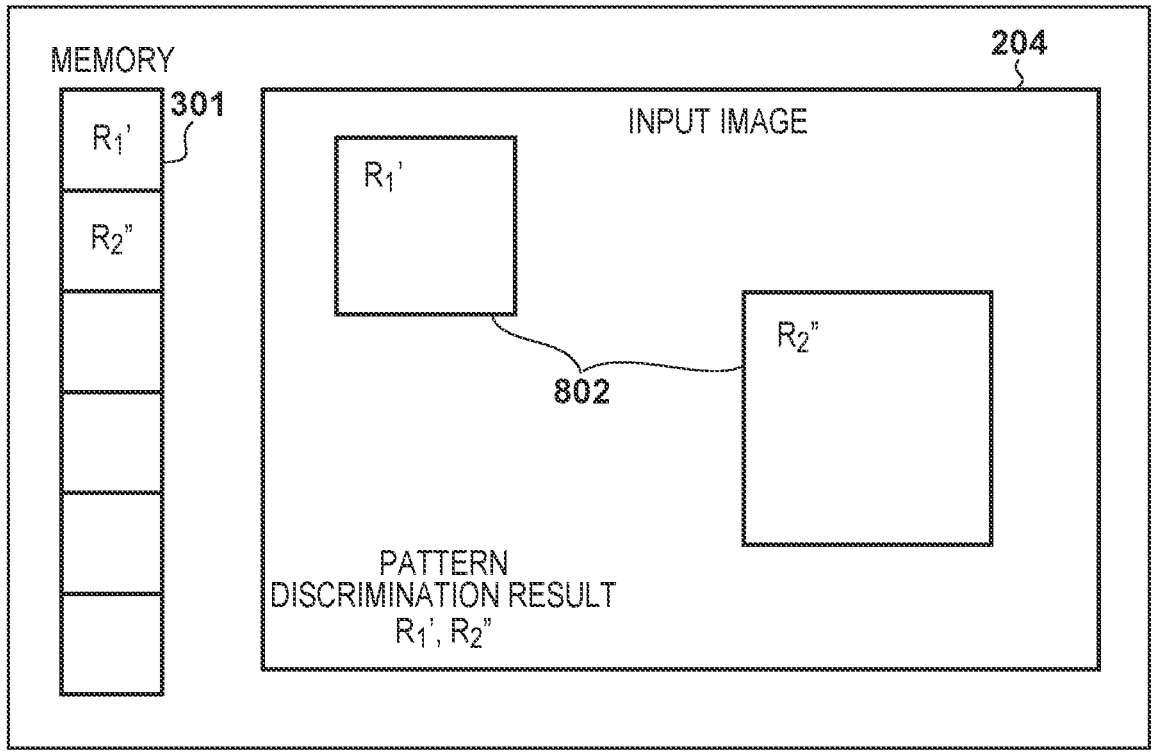
FIG. 7 is a diagram showing a state after a fourth instance of merge processing in merging processing.
FIGS. 8A-8C are diagrams illustrating an example of information indicating a pattern discrimination result.
Figure 8C:
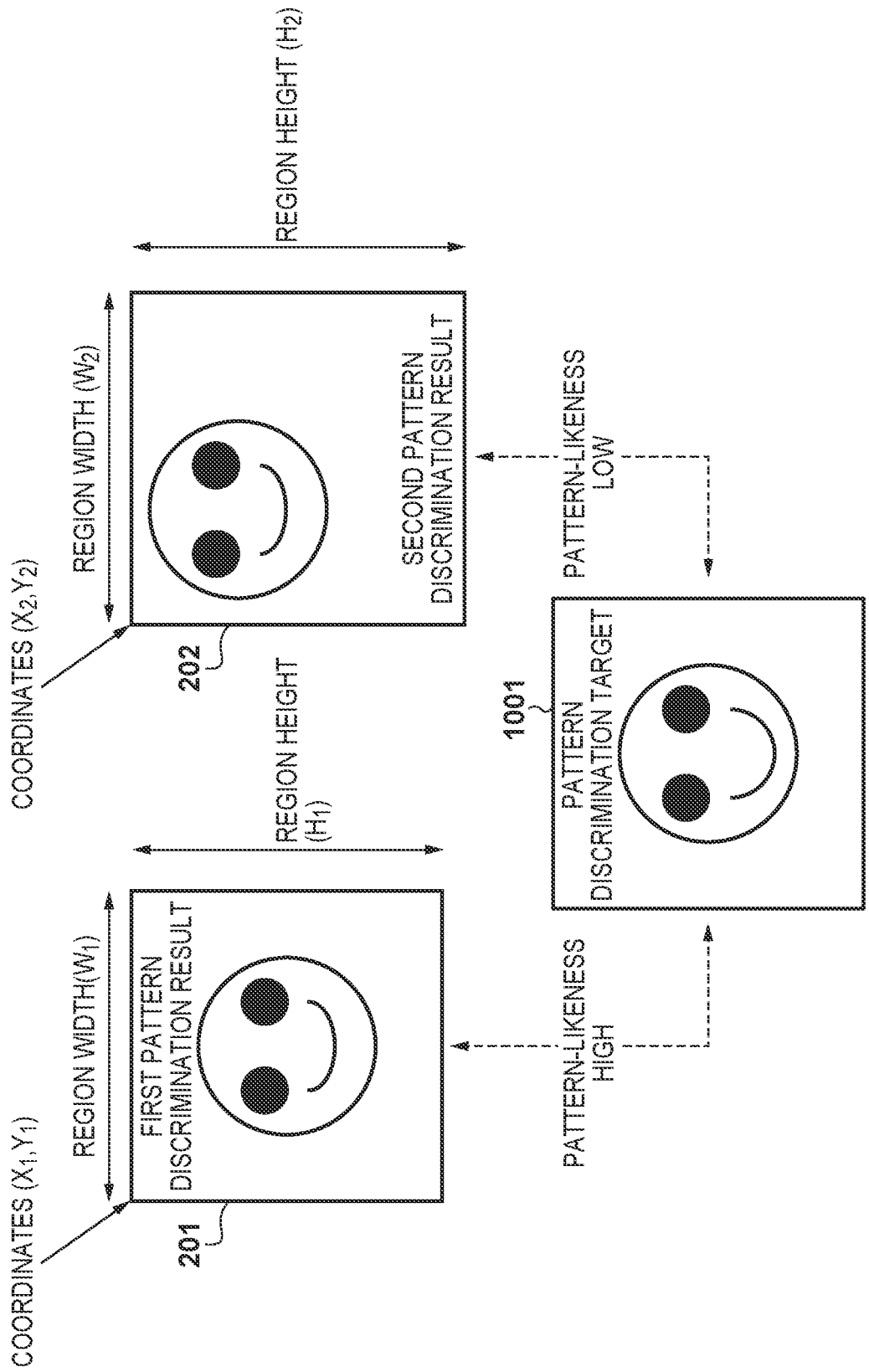

FIGS. 8A to 8C show examples of pattern discrimination results. A rectangle 1001 is a pattern that is to be discriminated (pattern discrimination target), and a smile pattern is located in its center. FIGS. 8A and 8B show a first discrimination result 1 and a second discrimination result 2 respectively, and respectively correspond to the discrimination result A and the discrimination result B illustrated in FIG. 2. The first discrimination result 1 includes the degree of reliability that the pattern discrimination target is included, the width and height of the rectangle 201 from which the pattern was extracted, and the upper-left coordinates of the rectangle 201. As shown in FIG. 8C, in the region indicated by the discrimination result A, the smile pattern is in the center of the rectangle 201, and is similar to the pattern discrimination target, and therefore the degree of reliability is high. The discrimination result B also similarly includes the degree of reliability, the width and height of the rectangle 202 from which the pattern was extracted, and the upper-left coordinates of the rectangle 202. As shown in FIG. 8C, in the region indicated by the discrimination result B, the smile pattern is located in the upper-left portion of the rectangle 202, and is shifted from the center, and therefore the degree of reliability is lower than that of the discrimination result A. In this example, the degree of reliability differs depending on the position of the smile pattern.

Figure 1:
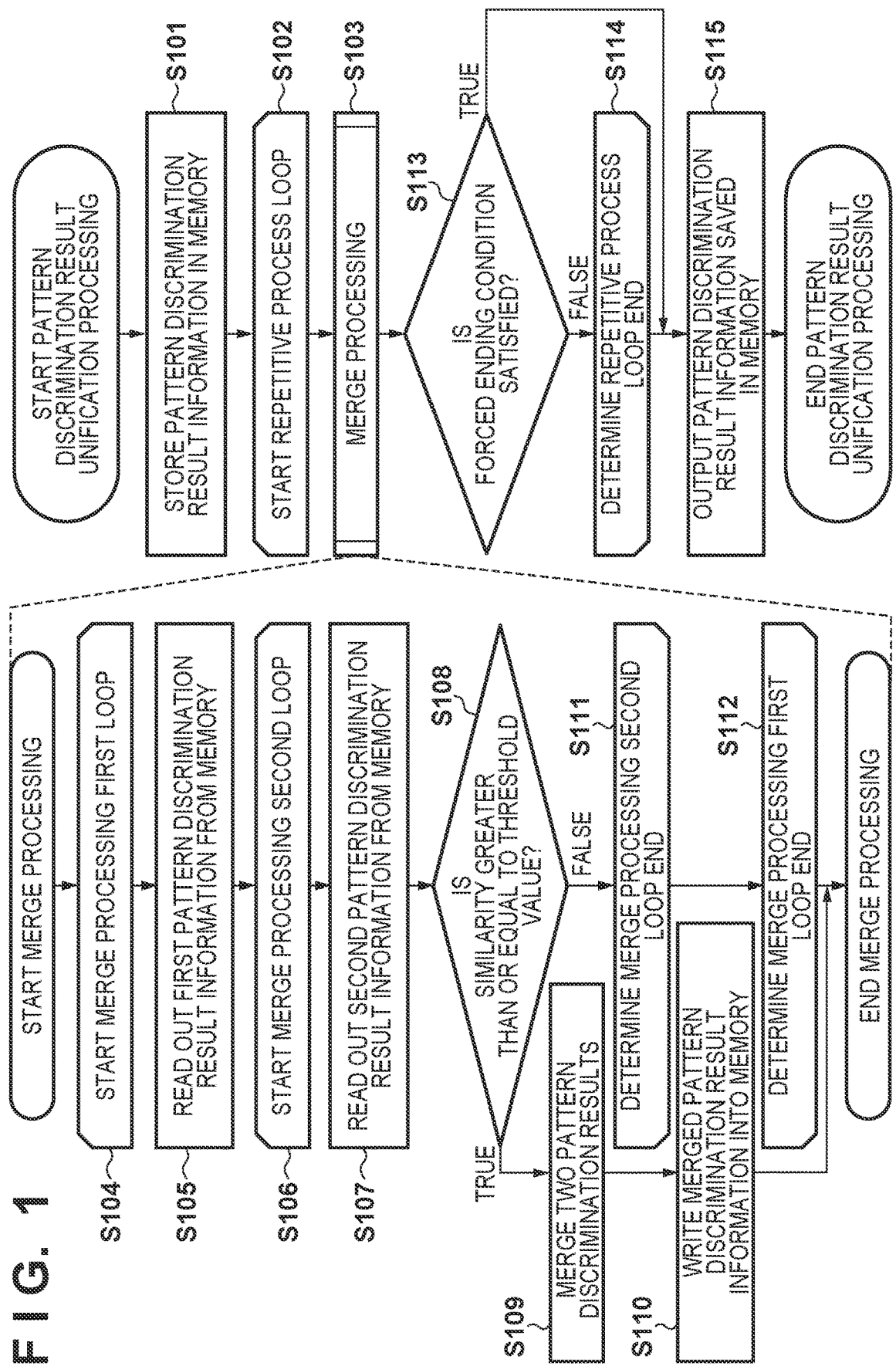
FIG. 1 is a flowchart showing an example of an information processing method for merging pattern discrimination results.

Hereinafter, processing for merging the pattern discrimination results according to an embodiment of the present invention will be described with reference to the flowchart of FIG. 1. In the processing below, as shown in FIGS. 8A and 8B, the discrimination processing unit 909 adds information indicating the merge count (initial value=1) to the pattern discrimination results in order to use the pattern discrimination results in the merging processing.

In step S101, the discrimination processing unit 909 acquires multiple pattern discrimination results each indicating the location of a pattern that is present in an image. The discrimination processing unit 909 can use processing for discriminating a specific pattern that is present in the image to generate a pattern discrimination result indicating the location of the specific pattern that is present in the image. However, the discrimination processing unit 909 may also acquire the pattern discrimination results from another unit or another apparatus. The discrimination processing unit 909 stores the acquired pattern discrimination results in a work area provided in the RAM 908. Here, the discrimination processing unit 909 can store the respective pattern discrimination results in different regions of the RAM 908.

In step S102, the CPU 906 starts a loop of repeated processing.

In step S103, the merging processing unit 905 performs merge processing. Details of merge processing (step S104 to step S112) will be described later.

In step S113, the CPU 906 determines whether or not a condition for performing forced ending of the loop of repeated processing has been satisfied. Examples of conditions for performing forced ending of the loop include a case in which processing time in which multiple pattern discrimination results acquired by the discrimination processing unit 909 are used exceeds a threshold value, and for example, a case in which processing time starting from when the repeated processing starts exceeds a predetermined time limit. Examples of other conditions for performing forced ending of the loop include a case in which a forced stop signal is received from a user or a processing unit. When a forced ending condition is satisfied, the repeated processing performed by the merging processing unit 905 is interrupted, and the processing advances to step S115. If not, the processing advances to step S114.

In step S114, the CPU 906 determines whether or not a condition for normally ending the loop of repeated processing has been satisfied. Examples of conditions for normally ending the loop include a case in which there are no more discrimination results that can be merged. Examples of other conditions for normally ending the loop include a case in which the number of instances of merging reaches a threshold value in processing using the multiple pattern discrimination results acquired by the discrimination processing unit 909. When a normal end condition is satisfied, the repeated processing performed by the merging processing unit 905 ends. Also, if no normal end condition is satisfied, the loop of repeated processing is continued, and the processing return to step S103.

In step S115, the CPU 906 outputs the pattern discrimination results stored in the RAM 908 to the data storage unit 902 or copies the pattern discrimination results to a region other than the work area of the RAM 908. Thus, the merging processing ends.

Hereinafter, the merge processing of step S103 will be described. In step S104, the merging processing unit 905 starts a first loop of the merge processing. In step S105, the merging processing unit 905 reads out one discrimination result from the RAM 908. The discrimination result read out by the merging processing unit 905 in step S105 will be referred to as "first discrimination result 1". In step S106, the merging processing unit 905 starts a second loop of the merge processing. In step S107, the merging processing unit 905 reads out one discrimination result from the RAM 908. The discrimination result read out by the merging processing unit 905 in step S105 differs from the first discrimination result 1, and the read-out discrimination result will be referred to as "second discrimination result 2".

The method for selecting the discrimination results to be read out in steps S105 and S107 is not particularly limited. For example, a discrimination result that has not yet been selected in a loop can be randomly selected. On the other hand, the pattern discrimination results can be selected in a controlled sequence. For example, in an embodiment, the merging processing unit 905 can select, with priority, a discrimination result that was not merged in the immediately-previous merge processing (S103) as the first discrimination result 1 or the second discrimination result 2. For example, in the first first loop of the merge processing (S103), the merging processing unit 905 can select a discrimination result that was not merged in the immediately-previous merge processing (S103) as the first discrimination result 1. Also, in the first second loop of the merge processing (S103), the merging processing unit 905 can select a discrimination result that was not merged in the immediately-previous merge processing (S103) as the second discrimination result 2. According to this kind of configuration, the target of merge processing is not likely to be focused on a specific discrimination result, and therefore a stable merging processing result is likely to be obtained as described later.

Furthermore, a sequence can be set for the pattern discrimination results, and the pattern discrimination results can also be selected in the set sequence. In a specific example, in the merge processing (S103), the discrimination result that is first selected as the first discrimination result 1 can be the discrimination result subsequent to the first discrimination result 1 merged in the previous instance of merge processing (S103). Also, the first discrimination result 1 selected in the second instance and onward in the merge processing (S103) can be the discrimination result subsequent to the discrimination result selected as the first discrimination result 1 immediately previously in the same merge processing (S103). Furthermore, the second discrimination result 2 that is selected first after the second loop starts can be the discrimination result subsequent to the discrimination result selected as the first discrimination result 1. Also, the second discrimination result 2 selected in the second instance and onward after the second loop starts can be the discrimination result subsequent to the discrimination result selected as the second discrimination result 2 immediately previously. According to this kind of configuration, stable merging processing is even more likely to be obtained. Specific examples of this kind of selection method will be described later with reference to FIGS. 3 to 7.

In this manner, in steps S105 and S107, the merging processing unit 905 selects the first discrimination result 1 and the second discrimination result 2 from multiple pattern discrimination results indicating the pattern discrimination results. On the other hand, the number of pattern discrimination results selected by the merging processing unit 905 is not particularly limited, and can be any predetermined number. In the present embodiment, this predetermined number is 2, but may also be 3 or more, and can be less than the number of pattern discrimination results acquired by the discrimination processing unit 909.

In step S108, the merging processing unit 905 determines whether or not to merge the predetermined number of pattern discrimination results selected from the multiple pattern discrimination results, based on the similarity of the locations indicated by the predetermined number of pattern discrimination results. Then, the merging processing unit 905 merges the predetermined number of pattern discrimination results for which it has been determined that merging is to be performed. For example, the merging processing unit 905 can determine whether or not the similarity is greater than or equal to a threshold value, and can merge the predetermined number of pattern discrimination results for which it has been determined that the similarity is greater than or equal to the threshold value. In the case of the present embodiment, the merging processing unit 905 determines whether or not the similarity of the locations indicated by the first discrimination result 1 and the second discrimination result 2 is greater than or equal to a threshold value for the two pattern discrimination results (the first discrimination result 1 and the second discrimination result 2) selected from the multiple pattern discrimination results. Then, the first discrimination result 1 and the second discrimination result 2 for which it was determined that the similarity is greater than or equal to a threshold value are merged.

In the present embodiment, the merging processing unit 905 determines whether or not to merge the predetermined number of pattern discrimination results in accordance with the degree of overlap of regions indicated by region information included in the predetermined number of pattern discrimination results. More specifically, if the degree of overlap between the region in which the pattern indicated by the first discrimination result 1 was detected and the region in which the pattern indicated by the second discrimination result 2 was detected is greater than a threshold value, the first discrimination result 1 and the second discrimination result 2 are merged. Accordingly, in an embodiment, the similarity calculated in step S108 represents the degree of overlap of the regions included in the predetermined number of pattern discrimination results. Also, in an embodiment, the similarity calculated in step S108 represents the degree of overlapping between the region in which the pattern indicated by the first discrimination result 1 was detected and the region in which the pattern indicated by the second discrimination result 2 was detected.

For example, the similarity S1,2 can be calculated in accordance with the equation below. In the equations below, A1 is the area of the region indicated by the first discrimination result 1, and A2 is the area of the region indicated by the second discrimination result 2. A1,2 is the area of the overlapping portion of the region indicated by the first discrimination result 1 and the region indicated by the second discrimination result 2. In the example shown in FIG. 2, a rectangle 203 is an overlapping region of the rectangle 201, which is the region indicated by the discrimination result A, and the rectangle 202, which is the region indicated by the discrimination result B, and the area of the rectangle 203 is the similarity between the discrimination result A and the discrimination result B. In this example, the similarity means the degree of overlapping between the rectangle 201 and the rectangle 202.

$$S1,2 = A1,2/\min(A1,A2)$$

In this example, the range of the threshold value T can be [0,1] (0 or more and 1 or less). If the similarity S1,2 is greater than or equal to the threshold value T, the processing advances to step S109, and if not, the processing advances to step S111.

In step S109, the merging processing unit 905 merges the first discrimination result 1 and the second discrimination result 2. In the present embodiment, the merging processing unit 905 generates a first discrimination result 1' by merging the first discrimination result 1 and the second discrimination result 2. The method for merging the discrimination results is not particularly limited. For example, the merging processing unit 905 can generate one piece of location information indicating both the location of the region indicated by the first discrimination result 1 and the location of the region indicated by the second discrimination result 2 based on the location of the region indicated by the first discrimination result 1 and the location of the region indicated by the second discrimination result 2. In a specific example, the average value of the coordinates, widths, or heights respectively indicated by the first discrimination result 1 and the second discrimination result 2 can be used as the coordinates, width, or height of the region indicated by the first discrimination result 1'. Information indicating a region that includes the regions respectively indicated by the first discrimination result 1 and the second discrimination result 2 may also be used as the first discrimination result 1'. The merging processing unit 905 can merge information indicating the locations of patterns (first information), such as the coordinates, widths, or heights of regions, for example, for a predetermined number of pattern discrimination results, and can further merge information that is unrelated to the locations of the patterns (second information), such as degrees of reliability, for example.

The merging processing unit 905 can use the number of instances of merging (merge count) performed to obtain the pattern discrimination results to generate the merged pattern discrimination results. The merge count for the first discrimination result 1 is the number of instances of merge processing performed in order to obtain the first discrimination result 1, and corresponds to the result of subtracting 1 from the number of pattern discrimination results obtained by the discrimination processing unit 909, which were merged in order to obtain the first discrimination result 1. The merge count for the second discrimination result 2 can also be obtained similarly. Then, the discrimination processing unit 909 can generate the merged pattern discrimination result by finding a weighted average obtained using the merge counts.

In one example, the merging processing unit 905 can generate the first discrimination result 1' in accordance with the equations below. In the equations below, (X1, Y1) are the coordinates (horizontal coordinate and vertical coordinate) of the upper-left vertex of the region indicated by the first discrimination result 1 and (W1, H1) are the width and height of the region indicated by the first discrimination result 1. N1 is the merge count for the first discrimination result 1 and is updated in accordance with the following equations. S1 is the degree of reliability of the first discrimination result 1. Similarity, (X2, Y2) are the coordinates (horizontal coordinate and vertical coordinate) of the upper-left vertex of the region indicated by the second discrimination result 2 and (W2, H2) are the width and height of the region indicated by the second discrimination result 2. Also, N2 is the merge count for the second discrimination result 2 and S2 is the degree of reliability of the second discrimination result 2.

$$N'1 = N1 + N2$$

$$X'1 = (X1 \times N1 + X2 \times N2)/N'1$$

$$Y'1 = (Y1 \times N1 + Y2 \times N2)/N'1$$

$$W'1 = (W1 \times N1 + W2 \times N2)/N'1$$

$$H'1 = (H1 \times N1 + H2 \times N2)/N'1$$

$$S'1 = \max(S1, S2)$$

(X'1, Y'1) are coordinates (horizontal coordinate and vertical coordinate) of the upper-left vertex of the region indicated by the first discrimination result 1' obtained through a merge, and (W'1, H'1) are the width and height of the first discrimination result 1'. N'1 is the merge count for the first discrimination result 1', and S'1 is the degree of reliability of the first discrimination result 1'. Here, X'1 is the weighted average of X1 and X2. The same applies to Y'1, W'1, and H'1.

In step S110, the merging processing unit 905 writes the first discrimination result 1' obtained through a merge in the RAM 908. At this time, the merging processing unit 905 can replace one of the predetermined number of merged pattern discrimination results stored in the RAM 908 with the pattern discrimination result indicating the discrimination result obtained through merging. For example, in the present embodiment, the merging processing unit 905 can replace the first discrimination result 1 with the first discrimination result 1'. On the other hand, the second discrimination result 2 that has not yet been merged may also be updated with the first discrimination result 1' obtained through a merge. In any case, there is no need to increase the amount of memory that is used to store the merged discrimination results since the regions storing the discrimination results that have not been merged are re-used. Of course, merged discrimination results may also be stored in new memory regions. In the merge processing thereafter, the first discrimination result 1' is used, whereas the first discrimination result 1 and the second discrimination result 2 are not used.

In step S111, the merging processing unit 905 determines whether or not to end the second loop of the merge processing. If all of the discrimination results have been read out as the second discrimination result 2 in the second loop, the second loop ends, and the processing advances to step S112. If not, the second loop continues, and the processing returns to step S107. In step S112, the merging processing unit 905 determines whether or not to end the first loop of the merge processing. If all of the discrimination results have been read out as the first discrimination result 1 in the first loop, the first loop ends, it is determined that there were no discrimination results that can be merged, and the processing of step S103 ends. If not, the first loop continues, and the processing returns to step S105.

In this manner, by repeating the processing of step S103, the merging processing unit 905 can repeatedly perform processing for merging different combinations of the predetermined number of pattern discrimination results to generate a new pattern discrimination result, and reducing the number of pattern discrimination results. Merged discrimination results that are fewer in number than the discrimination results acquired by the discrimination processing unit 909 are obtained as a result. Thereafter, the image processing unit 910 can perform image processing using the merged discrimination results. For example, the image processing unit 910 can perform recognition processing on a pattern such as a face that is present at a location represented by the merged discrimination results. In the present embodiment, the degree of reliability of the merged discrimination results can also be obtained, and therefore it is also possible to weight the recognition processing result using the degree of reliability.

Processing Example

Figure 3:
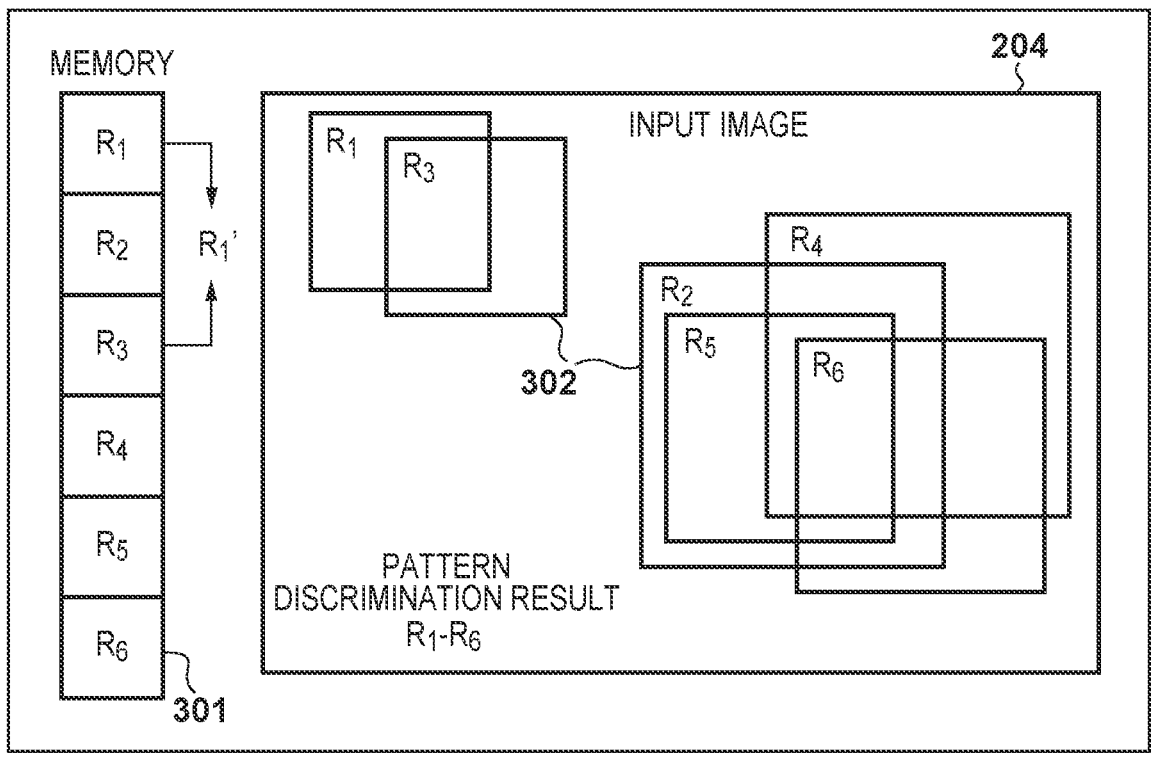
FIG. 3 is a diagram showing an initial state in merging processing.

Merging processing according to the present invention will be further described using a processing example in which six pattern discrimination results are merged into two pattern discrimination results. FIG. 3 is a diagram illustrating a first instance of repeated processing. In an initial state, six pattern discrimination results R1 to R6 have been obtained from an input image 204, and FIG. 3 shows regions 302 indicated by the discrimination results R1 to R6. A memory 301 is a portion of the RAM 908 and stores the pattern discrimination results R1 to R6.

In the first instance of merge processing, the discrimination result R1 is selected as a first discrimination result 1. Also, the discrimination results R2 to R6 that are subsequent to the discrimination result R1 are sequentially selected as the second discrimination result 2, and the similarities S1,2 are calculated. In this example, the similarity between the discrimination results R1 and R2 falls below a threshold value T, but the similarity between the discrimination results R1 and R3 is greater than or equal to the threshold value T, and therefore the discrimination results R1 and R3 are merged (step S109). Specifically, the discrimination result R1 that is stored in the memory 301 and has not yet been merged is updated using a first discrimination result 1' obtained through a merge (the first discrimination result 1' obtained through a merge will be referred to as "discrimination result R1'" in step S110 and thereafter). Also, the discrimination result R3 that was merged into the discrimination result R1' is not used thereafter.

Figure 4:
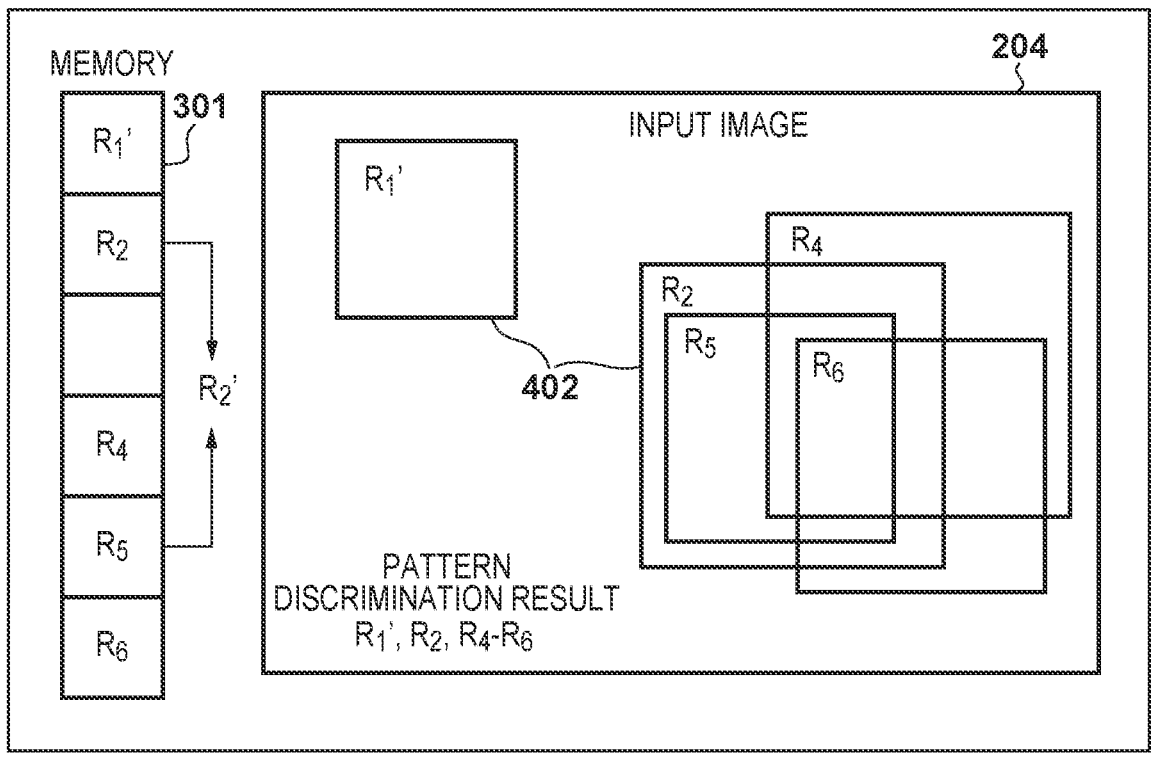
FIG. 4 is a diagram showing a state after a first instance of merge processing in merging processing.

FIG. 4 shows a state in which there are five pattern discrimination results (R1', R2, and R4 to R6) at a time when the first instance of repeated processing has ended. FIG. 4 also shows regions 402 indicated by the discrimination results. Note that if a forced end condition is satisfied at this time, the repeated processing is forcibly ended. In this case, five pattern discrimination results, which are intermediate results of the merging processing are obtained.

Figure 5:
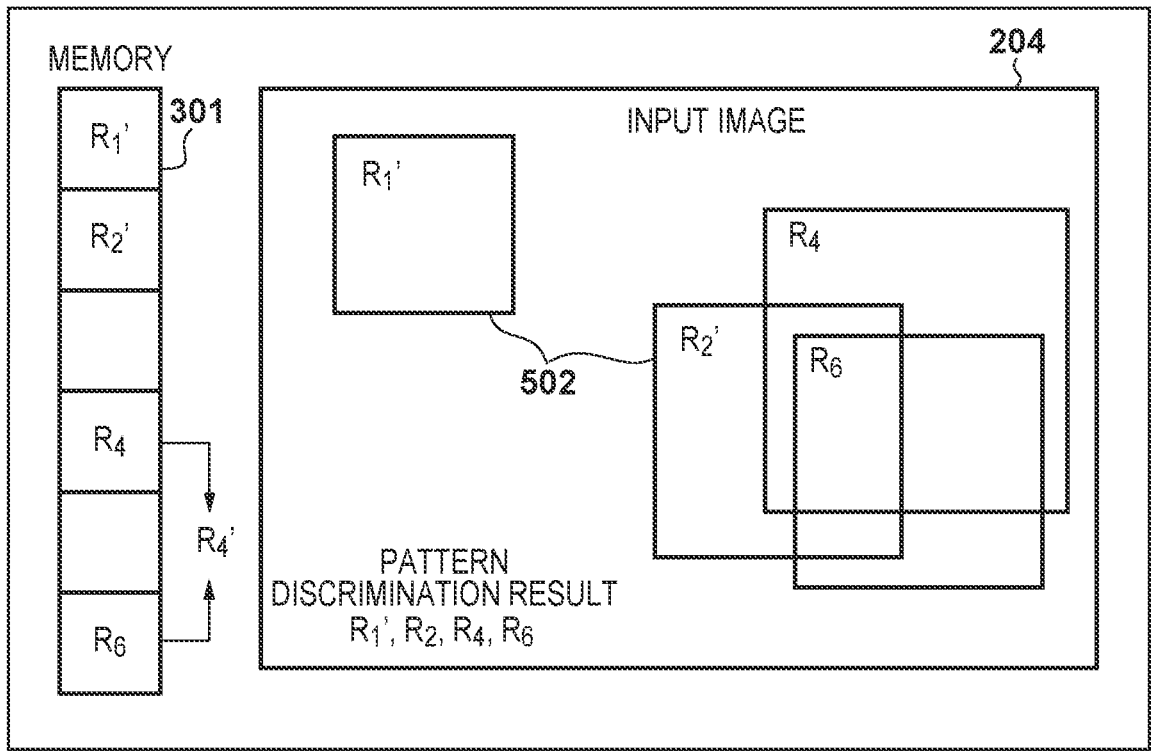
FIG. 5 is a diagram showing a state after a second instance of merge processing in merging processing.

The second instance of repeated processing will be described with reference to FIG. 4. Here, since the discrimination result R1 was selected as the first discrimination result 1 in the first instance of merge processing, the next discrimination result R2 has been selected as the first discrimination result 1. Also, the discrimination result R4 and onward subsequent to the discrimination result R2 are sequentially selected as the second discrimination result 2, and the similarities S1,2 are calculated. In this example, the similarity S1,2 between the discrimination result R2 and the discrimination result R5 is greater than or equal to the threshold value T, and therefore the discrimination results R2 and R5 are merged. Then, the discrimination result R2 that is stored in the memory 301 and has not yet been merged is updated with the discrimination result R2' obtained through the merge. FIG. 5 shows a state in which there are four pattern discrimination results (R1', R2', R4, R6) when the second instance of repeated processing has ended, and shows regions 502 indicated by the discrimination results. Here, if a forced end condition has been satisfied, the four pattern discrimination results are obtained as intermediate results of the merging processing.

Figure 6:
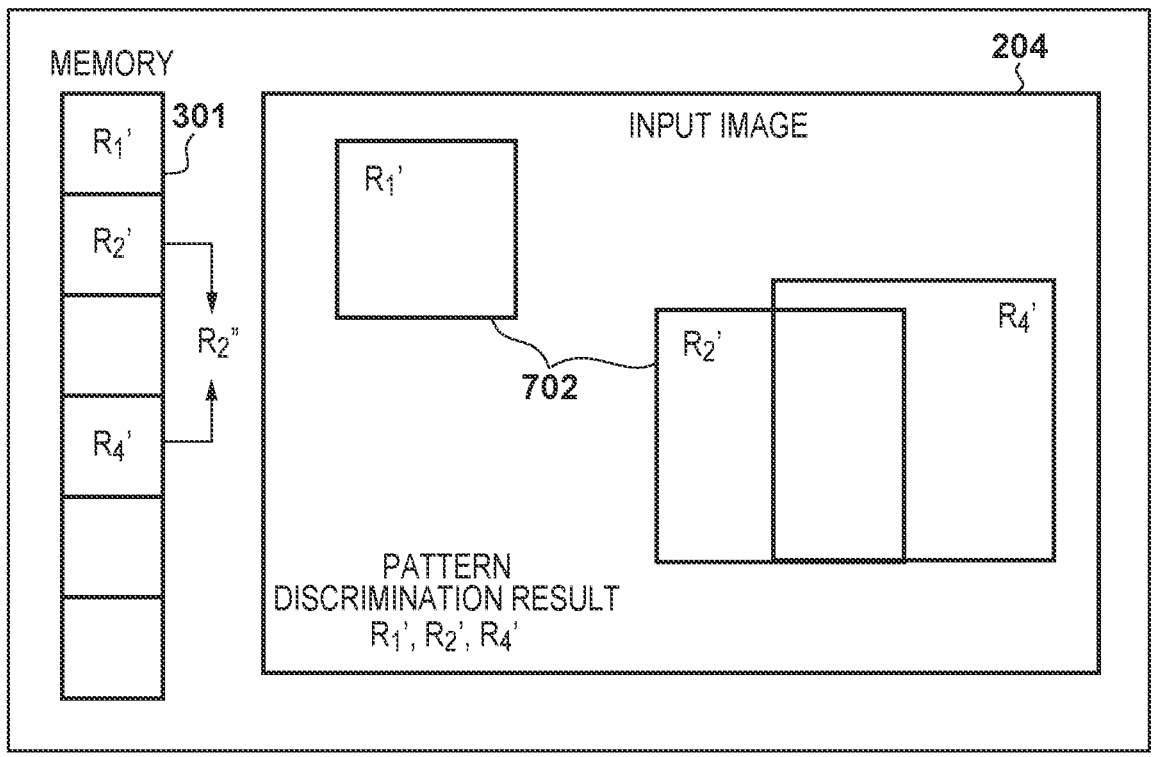
FIG. 6 is a diagram showing a state after a third instance of merge processing in merging processing.

The third instance of repeated processing will be described with reference to FIG. 5. The discrimination result R4 that is subsequent to the discrimination result R2 that was selected in the second instance of merge processing is similarly selected as the first discrimination result 1. Also, the subsequent discrimination result R6 and onward are sequentially selected as the second discrimination result 2. In this example, the similarity S1,2 between the discrimination result R4 and the discrimination result R6 is greater than or equal to the threshold T, and therefore the discrimination results R4 and R6 are merged, and the discrimination result R4 in the memory 301 is updated with the discrimination result R4' obtained through the merge. FIG. 6 shows a state in which there are three pattern discrimination results (R1', R2', R4') when the third instance of repeated processing has ended, and shows regions 702 indicated by the discrimination results. Here, if a forced end condition has been satisfied, the three pattern discrimination results are obtained as intermediate results of the merging processing.

The fourth instance of repeated processing will be described with reference to FIG. 6. The discrimination result R1' that is subsequent to the discrimination result R4 that was selected in the third instance of merge processing is similarly selected as the first discrimination result 1. Also, the subsequent discrimination result R2' and onward are sequentially selected as the second discrimination result 2.

In this example, no matter which discrimination result is selected as the second discrimination result 2, the similarity S1,2 will fall below the threshold value T, and therefore the discrimination result R1' will not be merged therewith. Next, the discrimination result R2' that is subsequent to the discrimination result R1' is selected as the first discrimination result 1, and the subsequent discrimination result R4' and onward are sequentially selected as the second discrimination result 2. In this example, the similarity S1,2 between the discrimination result R2' and the discrimination result R4' is greater than or equal to the threshold value T, and therefore the discrimination results R2' and R4' are merged and the discrimination result R2' in the memory 301 is updated with a discrimination result R2'' obtained through the merge. FIG. 7 shows a state in which there are two pattern discrimination results (R1', R2'') when the fourth instance of repeated processing has ended, and shows regions 802 indicated by the discrimination results. Here, if a forced end condition has been satisfied, the two pattern discrimination results are obtained as intermediate results of the merging processing.

The fifth instance of repeated processing will be described with reference to FIG. 7. The discrimination result R1' that is subsequent to the discrimination result R2'' selected in the fourth instance of merge processing is selected as the first discrimination result 1, and the subsequent discrimination result R2'' is selected as the second discrimination result 2. However, since the similarity S1,2 falls below the threshold value T, the discrimination result R1' is not merged. Since the same applies also in the case where the discrimination result R2'' is selected next as the first discrimination result 1, the processing of step S103 ends without performing a merge. This corresponds to a case in which there are no more discrimination results that can be merged, and therefore it is determined in step S114 that a normal end condition has been satisfied, and the repeated processing ends.

In the present embodiment, the processing for merging is repeated if the two selected pattern discrimination results have a similarity that is greater than or equal to a threshold value. For this reason, it is possible to reduce the amount of a work memory such as a RAM that is used, in comparison with a case in which merging is performed after all discrimination results with overlapping regions are discovered, as in Viola.

Also, since the load of each of the repeated processing is smaller compared to that of Viola, a small number of instances of merge processing can be performed even in a short time. For this reason, even if the merging processing is forcibly ended, intermediate results obtained by merging several discrimination results can be obtained. This kind of merging processing according to the present embodiment can be applied to real-time processing in which processing time is limited, and specifically can be applied to a case in which image processing or image identification is performed on a region extracted by performing pattern discrimination on a moving image.

In one embodiment, pattern discrimination results whose similarity is greater than or equal to a threshold value are merged, and therefore the repeated processing advances and the number of pattern discrimination results decreases one by one. According to this kind of configuration, the number of pattern discrimination results indicating one pattern discrimination target in a period when merge processing is being performed repeatedly is easily made uniform between different pattern discrimination targets. For this reason, in a state in which a set of pattern discrimination results whose similarity is greater than or equal to a predetermined threshold remains, even if the repeated processing is interrupted or ended partway through, it is possible to output stable merging processing results. Here, "stable" means that if there are multiple pattern discrimination targets in an image, there is only a smaller amount of deviation in the number of pattern discrimination results indicating respective pattern discrimination targets. Due to the merging processing results being stable, it is possible to maintain the accuracy of the pattern discrimination results that were merged and output, and it is possible to maintain the accuracy and efficiency of latter-stage processing using the output pattern discrimination results.

As an example, a case will be described in which object recognition processing is performed on a moving image. In this case, processing for discriminating a pattern such as a face or a human body can be performed on each continuous frame image, and the pattern discrimination results can further be merged. Furthermore, it is possible to recognize an object using the merged pattern discrimination result. Here, if there is deviation in the pattern discrimination results for each person, that is, if the merging processing results are unstable, the calculation amount for the object recognition processing tends to increase, and the accuracy tends to decrease. For example, in the case of performing recognition processing on a subsequent frame image using a recognition result for a previous frame image, it is possible to perform association of the person between the frame images. However, if the number of pattern discrimination results indicating the same person is significantly different between frame images, this association will become difficult, and the calculation amount will increase. According to the present embodiment, the calculation amount can be reduced and the accuracy can be improved when performing object recognition processing on a moving image in a later stage in particular, since it is easy to obtain a stable merging processing result.

Further Embodiments

In step S111, the second loop ended when all of the discrimination results were read out as the second discrimination result 2 in the second loop of the merge processing. However, the processing is not limited to this method. For example, in one instance of merge processing (step S103), the second loop may end if all of the discrimination results except for a discrimination result that has already been read out as a first discrimination result 1 in the first loop have been read out as the second discrimination result 2 in the second loop.

In the above-described processing, the minimum value of the areas A1 and A2 were used as the denominators in the equation for calculating the similarity S1,2, but the method for calculating the similarity is not limited to this method. For example, the maximum value or average value of the areas A1 and A2 may also be used as the denominator. Also, the similarity S1,2 can be any metric (non-similarity, distance) that reflects similarity and is calculated using the pattern discrimination results. In this case, in step S106, it is also possible to determine whether or not the similarity S1,2 is less than or equal to the threshold value.

In the above-described embodiment, information indicating the location of the pattern (first information) was used to decide whether or not to merge the discrimination results, and specifically, the degree of overlap of the region obtained using the first information was calculated as the similarity. However, both information indicating the location of the pattern (first information) and information unrelated to the location of the pattern (second information) can be used to decide whether or not to merge the discrimination results. That is, the merging processing unit 905 can further determine whether or not to merge a predetermined number of pattern discrimination results with consideration given to the second information for the predetermined number of pattern discrimination results. For example, both the first information and the second information can be used to calculate the similarity. As a specific example, the similarity can be calculated such that the similarity is higher when the degree of reliability of the pattern is higher, and the similarity can be calculated such that the similarity is higher if the second information is more similar, such as a case in which the orientations of the patterns are similar.

The method for merging the discrimination results is also not particularly limited. For example, in the above-described embodiment, the weighted averages of the vertex coordinates, widths, and heights obtained using the merge count were used as the merged discrimination results. On the other hand, it is also possible to generate the merged pattern discrimination results using information that is unrelated to the location of the pattern (second information) for the predetermined number of pattern discrimination results. For example, the weighted averages of the vertex coordinates, widths, and heights obtained using the degree of reliability may also be used as the merged discrimination results. Also, there is no need to obtain weighted averages, and it is possible to use values calculated based on the discrimination results in accordance with any function (e.g., maximum values, etc.) as the merged discrimination results. Furthermore, in the above-described embodiments, the maximum values of the degrees of reliability of two discrimination results were used as the degrees of reliability of the merged discrimination results, but it is also possible to use values obtained according to another function such as a weighted average or an average of the degrees of reliability.

In the above-described embodiments, after the merge processing, it was determined in step S113 whether or not the forced end condition is satisfied, but the timing of performing this determination is not particularly limited. For example, determination of whether or not the forced end condition is satisfied may also be performed between steps S111 and S112. In this case, if the forced end condition is satisfied, the processing can jump to step S115.

An embodiment of the present invention enables to obtain output obtained by merging some pattern discrimination results even if processing for merging pattern discrimination results is stopped partway through.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An information processing apparatus comprising:
one or more processors; and
one or more memories coupled to the one or more processors, the one or more memories having stored therein instructions that, when executed by the one or more processors, cause the apparatus to:
(1) acquire a plurality of regions each indicating a location from which a predetermined pattern has been detected in an image;
(2) perform a repetition process in which a selection process, a determination process, and a merging process are repeatedly performed, wherein:
(a) in the selection process, a pair of regions are selected from the plurality of regions;
(b) in the determination process, it is determined whether or not the selected pair of regions are to be merged, based on similarity of the locations indicated by the selected pair of regions; and
(c) in the merging process, if the selected pair of regions have been determined to be merged and the plurality of regions are updated by replacing the selected pair of regions with the new single region; and
(3) interrupt the repetition process and output the updated plurality of regions if a time taken for performing the repetition process using the acquired plurality of regions exceeds a threshold value.

2. The information processing apparatus according to claim 1, wherein the instructions, when executed by the one or more processors, further cause the apparatus to:
store the plurality of regions in respective different regions of the one or more memories, and
store the single new region in place of one of the selected pair of regions stored in the one or more memories if the selected pair of regions are merged.

3. The information processing apparatus according to claim 1,
wherein the instructions, when executed by the one or more processors, further cause the apparatus to obtain a degree of the similarity in accordance with a degree of overlap of the regions in the selected pair of regions.

4. The information processing apparatus according to claim 1, wherein the instructions, when executed by the one or more processors, further cause the apparatus to determine whether or not a degree of the similarity is greater than or equal to a second value, and to merge the selected pair of regions for which it was determined that the degree of the similarity is greater than or equal to the second threshold value.

5. The information processing apparatus according to claim 1, wherein each region of the plurality of regions is associated with information that is unrelated to the location of the predetermined pattern, and wherein the instructions, when executed by the one or more processors, further cause the apparatus to merge the information associated with the selected pair of regions.

6. The information processing apparatus according to claim 5, wherein the information associated with each region of the plurality of regions includes information indicating a likelihood that the predetermined pattern is present in the respective region.

7. The information processing apparatus according to claim 5, wherein the information associated with each region of the plurality of regions includes information indicating a characteristic of the predetermined pattern that is present in the respective region.

8. The information processing apparatus according to claim 5, wherein the instructions, when executed by the one or more processors, further cause the apparatus to determine whether or not the selected pair of regions are to be merged in consideration of the information associated with the selected pair of regions.

9. The information processing apparatus according to claim 5, wherein the instructions, when executed by the one or more processors, further cause the apparatus to merge the selected pair of regions using numbers of instances of merging performed in order to obtain respective regions in the selected pair.

10. The information processing apparatus according to claim 5, wherein the selected pair or regions are merged using the information associated with the selected pair of regions.

11. The information processing apparatus according to claim 5, wherein the plurality of regions are represented by position information and size information of respective regions.

12. The information processing apparatus according to claim 1, wherein the instructions, when executed by the one or more processors, further cause the apparatus to repeatedly perform processing for selecting different pairs of regions; and wherein the instructions, when executed by the one or more processors, further cause the apparatus to repeatedly perform processing for merging the selected different pairs of regions to generate new single regions and thereby reduce the number of regions in the plurality of regions.

13. The information processing apparatus according to claim 12, wherein the instructions, when executed by the one or more processors, further cause the apparatus to, in processing using the acquired plurality of regions, end repetition if the number of regions in the plurality of regions reaches a threshold value.

14. The information processing apparatus according to claim 1, wherein the instructions, when executed by the one or more processors, further cause the apparatus to:

sequentially select a first region of the pair of regions from the plurality regions and sequentially select a second region of the pair of regions for the first region of the pair of regions from the plurality of regions other than the first region; and determine whether or not the second region is to be merged with the first region.

15. The information processing apparatus according to claim 1, wherein the instructions, when executed by the one or more processors, further cause the apparatus to detect a plurality of regions each indicating a location of the predetermined pattern that is present in the image.

16. An information processing method comprising:

acquiring a plurality of regions each indicating a location from which a predetermined pattern has been detected in an image;

repeating a process of selecting, determining, and merging, wherein:
 (a) the selecting selects a pair of regions from the plurality of regions;
 (b) the determining determines whether or not the selected pair of regions are to be merged, based on similarity of locations indicated by the selected pair of regions; and
 (c) the merging merges the selected pair of regions into a new single region if the selected pair of regions have been determined to be merged and updates the plurality of regions by replacing the selected pair of regions with the new single region; and interrupting the process and outputting the updated plurality of regions if a time taken for performing the process using the acquired plurality of regions exceeds a threshold value.

17. A non-transitory computer-readable medium storing a program which, when executed by a computer comprising a processor and a memory, causes the computer to perform:

acquiring a plurality of regions each indicating a location from which a predetermined pattern has been detected in an image;

repeating a process of selecting, determining, and merging, wherein:
 (a) the selecting selects a pair of regions from the plurality of regions;
 (b) the determining determines whether or not the selected pair of regions are to be merged, based on similarity of locations indicated by the selected pair of regions; and
 (c) the merging merges the selected pair of regions into a new single region if the selected pair of regions have been determined to be merged and updates the plurality of regions by replacing the selected pair of regions with the new single region; and interrupting the process and outputting the updated plurality of regions if a time taken for performing the process using the acquired plurality of regions exceeds a threshold value.

* * * * *